(12) United States Patent
Haschke

(10) Patent No.: US 8,795,037 B2
(45) Date of Patent: Aug. 5, 2014

(54) DOUBLE CLIPPER

(71) Applicant: Eggo Haschke, Deerfield, IL (US)

(72) Inventor: Eggo Haschke, Deerfield, IL (US)

(73) Assignee: Precitec Corp., Mundelein, IL (US)

( * ) Notice: Subject to any disclaimer, the term of this patent is extended or adjusted under 35 U.S.C. 154(b) by 0 days.

(21) Appl. No.: 13/792,530

(22) Filed: Mar. 11, 2013

(65) Prior Publication Data

US 2014/0051342 A1  Feb. 20, 2014

Related U.S. Application Data

(60) Provisional application No. 61/683,458, filed on Aug. 15, 2012.

(51) Int. Cl.
*A22C 11/00* (2006.01)
*A22C 11/12* (2006.01)

(52) U.S. Cl.
CPC ................................. *A22C 11/125* (2013.01)
USPC ........................................................ 452/48

(58) Field of Classification Search
USPC ........... 452/21–26, 30–32, 35–37, 46–48, 51; 53/138.1–138.4, 567, 576, 417; 29/243.56, 243.57; 83/399, 400
See application file for complete search history.

(56) References Cited

U.S. PATENT DOCUMENTS

| | | | |
|---|---|---|---|
| 5,495,701 A | | 3/1996 | Poteat et al. |
| 5,573,454 A | * | 11/1996 | Fox et al. ........................ 452/29 |
| 5,743,792 A | * | 4/1998 | Hanten et al. ................... 452/37 |
| 5,755,022 A | * | 5/1998 | Whittlesey ....................... 29/788 |
| 5,816,903 A | * | 10/1998 | Idziak .............................. 452/49 |
| 6,524,178 B1 | * | 2/2003 | Fassler et al. ................... 452/37 |
| 7,395,638 B2 | | 7/2008 | Wilkins et al. |
| 7,654,889 B2 | * | 2/2010 | Ebert et al. ...................... 452/48 |
| 7,854,103 B2 | * | 12/2010 | Griggs et al. ................. 53/138.1 |
| 2011/0039486 A1 | | 2/2011 | Mysker |

FOREIGN PATENT DOCUMENTS

EP  1053683 A2  11/2000

OTHER PUBLICATIONS

International Search Report and the Written Opinion of the International Searching Authority, or the Declaration of International Application No. PCT/US2013/054482, Jan. 10, 2014, pp. 1-8).

* cited by examiner

*Primary Examiner* — Richard Price, Jr.
(74) *Attorney, Agent, or Firm* — Timothy M. McCarthy; Clark Hill PLC

(57) ABSTRACT

An improved system for stuffing material is described. The clipping system includes a first clipper comprising a clip reel, a clip rail, a punch, and a die, the punch configured to engage a single clip and the die having a set of two depressions configured to engage and bend a pair of legs of the single clip, and further includes a second clipper mounted adjacent the first clipper, the second clipper comprising a second clip reel, a second clip rail, a second punch, and a second die, the second punch configured to engage a pair of clips and the second die having two sets of two depressions configured to engage and bend the legs of the pair of clips.

9 Claims, 4 Drawing Sheets

DOUBLE CLIPPER

PRIORITY

This application claims priority from U.S. Provisional Patent Application No. 61/683,458, filed Aug. 15, 2012, the disclosure of which is incorporated herein in its entirety.

BACKGROUND OF THE INVENTION

The present invention relates generally to a device for applying clips to close pasty filling within fibrous, collagen, or synthetic casings. The invention relates more specifically to a device for applying a single clip at a first end of a sausage and applying two clips at a second end of a sausage.

Automated clippers are used in the preparation of for example, sausages. A pasty mixture of meat and spices is mixed in a mixer and pumped to a filling machine. In some applications, flat stock is turned over a plow and formed into a tubular casing into which the pasty mixture is extruded. In other applications, casing that is manufactured as a tube or natural tubular casing is shirred onto a horn and the pasty mixture is extruded through the horn and into the casing. In either of these types of applications, the filled tube or casing is also enclosed in netting.

The filled casing, with or without netting, is presented to a double clipper, such as an FCA Automatic Double-Clipper manufactured by Precitec, Inc. of Mundelein, Ill., United States. A pair of irises close over the filled casing, creating a void neck between the irises. The double-clipper has two reels of clips feeding two rails that deliver clips to the clipping area. The neck is placed over two dies and two punches descend to apply two clips to close the neck. A knife cuts the casing between the two clips. The downstream clip is the end of a completed sausage; the upstream clip is the beginning of a new sausage.

In some applications, a string or a loop is captured in one of the clips applied to the sausage. The string or loop is used to hang the sausage in a smokehouse for further processing. Since the sausages hang vertically in the smokehouse, there is more pressure on the clip at the lower end of the sausage, because of the weight of the filling, than on the clip at the upper end of the sausage. Both clips must hold a tight seal on the casing to prevent leakage of contents of the sausage and to prevent contamination. A prior-art solution applies two clips at an end of the sausage. To do so, one clipper of the double clipper fired twice. Since a clipper, after applying a first clip, must retract the punch and get ready to apply the next clip, applying two clips to an end of a sausage causes delays in processing of manufactured sausages.

The present invention addresses some of the deficiencies of the prior art.

SUMMARY OF THE INVENTION

The preferred embodiment of the present invention comprises an improved double clipper that includes a first clipper comprising a clip reel, a clip rail, a punch, and a die, the punch configured to engage a single clip and the die having a set of two depressions configured to engage and bend a pair of legs of the single clip, and further includes a second clipper mounted adjacent the first clipper, the second clipper comprising a second clip reel, a second clip rail, a second punch, and a second die, the second punch configured to engage a pair of clips and the second die having two sets of two depressions configured to engage and bend the legs of the pair of clips.

In another aspect, an embodiment of the invention comprises the steps of mixing ingredients to form a pasty mixture, pumping the pasty mixture into a sealer, extruding the pasty mixture into a tube, forming a void neck in the tube, applying a first clip to the void neck, applying a pair of second clips to the void neck, and severing the neck between the first clip and the pair of second clips.

A BRIEF DESCRIPTION OF THE DRAWINGS

The organization and manner of the structure and operation of the invention, together with further objects and advantages thereof, may best be understood by reference to the following description, taken in connection with the accompanying non-scale drawings, wherein like reference numerals identify like elements in which.

DETAILED DESCRIPTION OF THE ILLUSTRATED EMBODIMENT

Figure 1:
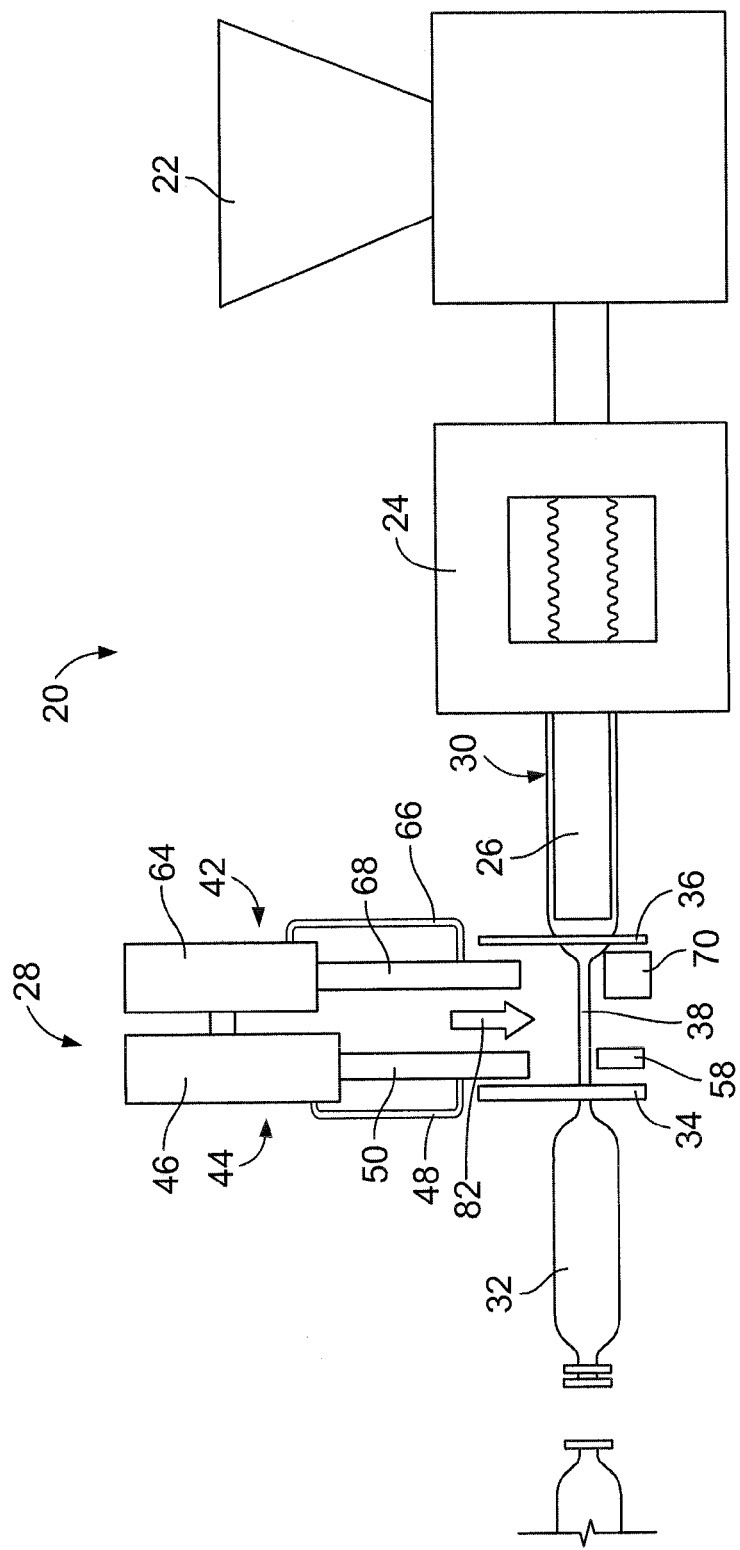
FIG. 1 is an elevation schematic view of an automated sausage-manufacturing operation using the clipper of the preferred embodiment of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. The embodiments of the present invention will be described as part of a double clipper to be incorporated into a sausage-making system. The present invention, however, can also be used for clipping bags, tubes, netting, or other packaging materials containing contents such as sealants, adhesives, or explosives, or for any other application in which a clip is applied to close a flexible container.

The preferred embodiment of the automated sausage-making system 20 of the present invention is shown in elevation schematic view in FIG. 1. System 20 comprises a mixer 22 connected to a sealer 24.

Mixer 22 receives meat and spices and other ingredients and mixes them to form a pasty mixture. The pasty mixture is pumped downstream towards sealer 24 through product tube 26. Sealer 24 is preferably a sealer such as a TSA 120 Automatic Sealing Machine made by Precitec, Inc. of Mundelein, Ill., United States. Sealer 24 could instead be a stuffer using tubular synthetic casing or tubular natural casing, or could be a hybrid filling system, as described in U.S. Pat. No. 7,914,364 to Mysker, Hybrid Filling System, the disclosure of which is incorporated by reference in its entirety. Sealer 24 could also be a netter, as described in U.S. Pat. No. 7,441,386, Apparatus for Forming Tubes in Nets, the disclosure of which is incorporated by reference in its entirety.

Sealer 24 turns flat stock film over a plow and seals the seam of the film to form tube 30 around product horn 26. The pasty mixture is extruded through product horn 26 and into tube 30 to begin to form a sausage 32. The pasty mixture fills tube 30, which expands into a sausage shape. When a sufficient amount of pasty mixture has filled tube 30, a pair of voider gates 34, 36, preferably irises, close around tube 30, forming a void neck 38 in tube 30. Void neck 38 has been substantially voided of pasty mixture by voider gates 34, 36 in a conventional manner.

Figure 5A:
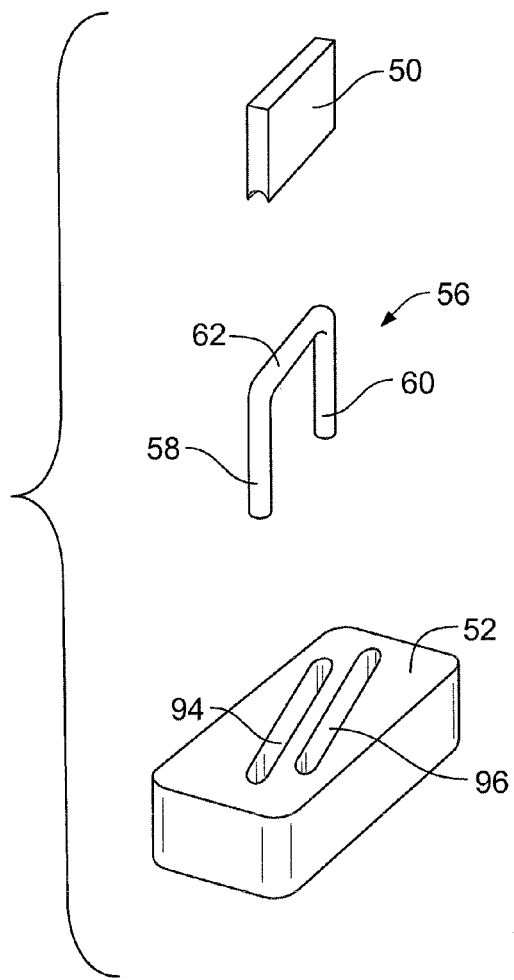
FIG. 5A is a schematic view of some of the components of the downstream clipping apparatus of FIG. 1.

Neck 38 is next clipped by clipper 28. Clipper 28 is a double clipper having an upstream clipping apparatus 42 and a downstream clipping apparatus 44 mounted adjacent each other, downstream of product horn 30. Downstream clipping apparatus 44 has a reel 46, a clip rail 48, a punch 50, and a die 52. Reel 46 is wound with a line of clips 56, which can be plastic or metal and each of which has a first leg 58, a second leg 60, and a connecting portion 62, as shown in FIG. 5A. Clips 56 feed down clip rail 48. The first clip 56 in line is placed above neck 38. Punch 50 engages clip 56 and pushes legs 58, 60 of clip 56 against die 52, causing clip 56 to close upon itself and seal neck 38.

Figure 5B:
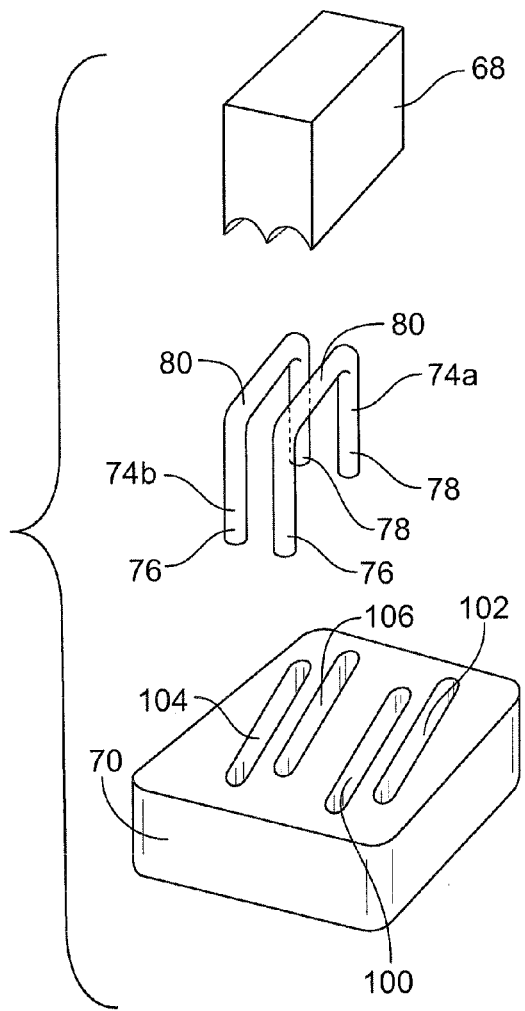
FIG. 5B is a schematic view of some of the components of the upstream clipping apparatus of FIG. 1.

Upstream clipping apparatus 44 has a reel 64, a clip rail 66, a punch 68, and a die 70. Reel 64 is wound with a line of clips 74, which can be plastic or metal and are preferably identical to clips 56. Each of clips 74 has a first leg 76, a second leg 78, and a connecting portion 80, as shown in FIG. 5B. Clips 74 feed down clip rail 66. On upstream clipping apparatus 44, however, two clips 74a, 74b are placed above neck 38, as shown in FIG. 5B. Punch 50 engages both clips 74a, 74b substantially simultaneously and pushes the legs 76, 78 of each respective clip 74a, 74b against die 70, causing each clip 74a, 74b to close upon itself and seal neck 38. Voider gates 34, 36 then disengage. Punch 50 is preferably a single punch wide enough to engage connecting portion 80 of two clips 74a, 74b simultaneously. Alternatively, punch 50 can be a pair of punches aligned next to each other, each one engaging a single clip 74 substantially simultaneously.

Figure 2:
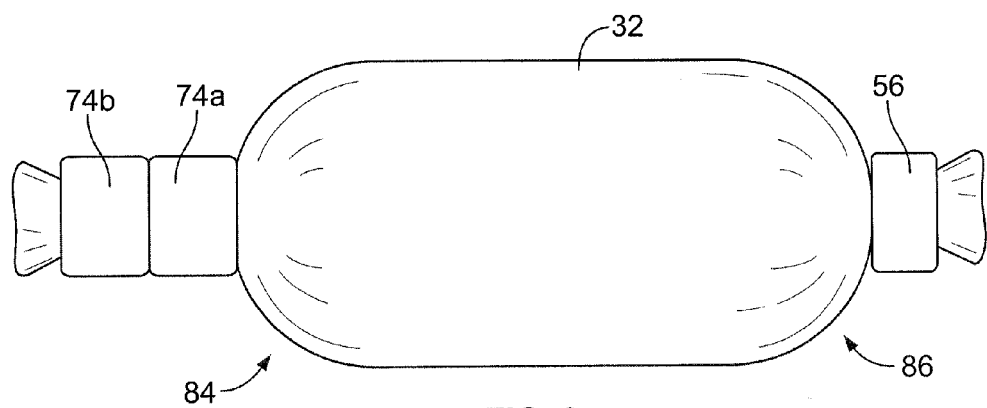
FIG. 2 is a view of a sausage made by the apparatus of FIG. 1.

Neck 38 is now sealed by three clips, a single clip 56 applied by downstream clipping apparatus 44 and, a short distance upstream, a pair of clips 74a, 74b applied by upstream clipping apparatus 42. Preferably, a knife 82 severs neck 38 between single clip 56 and pair of clips 74. Clip 56 has become the final and upstream end 86 of a sausage 32. Clips 74a, 74b have become the initial and downstream end 84 of what will be the next sausage 32 to be manufactured. Mixer 22 continues to fill tube 30 until it reaches the appropriate size, at which point voider gates 34, 36 re-engage and new clips 56, 74a, 74b are applied and the process repeats. A completed sausage 32 is shown in FIG. 2.

In some applications, neck 38 is not severed between every pair of sausages 32, but is instead severed less periodically, to formed linked strings of sausages having two or more sausages in each chain. For example, system 20 might sever neck 38 after every fifth sausage 32, so that instead of producing a plurality of individual sausages, system 20 produces strings of five connected sausages 32. Since the five connected sausages in this example might still be hung in a smokehouse from one end, there is still an advantage to having two clips at the lower end of each individual sausage segment.

By applying a pair of clips 74a, 74b to one end of sausage 32, hanging of sausage 32 in, for example, a smokehouse, is enhanced. If sausage 32 is hanged from upstream end 86, for curing, smoking, or other processing, the weight of the pasty mixture is less likely to burst through downstream end 84, because two clips, not one, seal tube 30.

Figure 3:
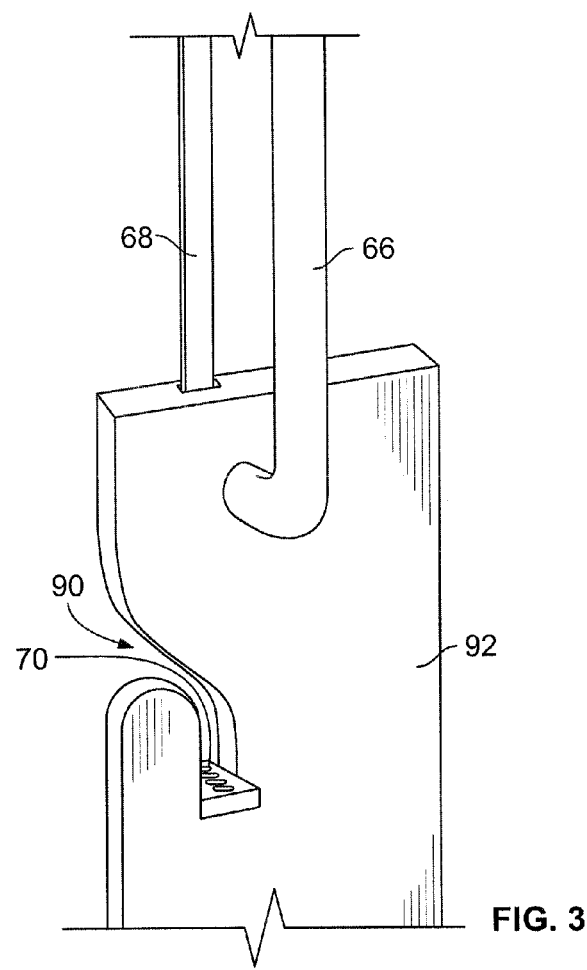
FIG. 3 is a perspective view of a portion of the upstream clipping apparatus of the clipper of FIG. 1.

A portion of upstream clipping apparatus 42 of clipper 28 is shown in perspective view in FIG. 3. Upstream clip rail 66 carries clips 74 from reel 64 and feeds clips 74 to clipping zone 90 as defined by clip die support 92. Upstream punch 68, preferably powered by an air-actuated cylinder (not shown), actuates to cause two clips 74a. 74b to close over neck 38.

Figure 4A:
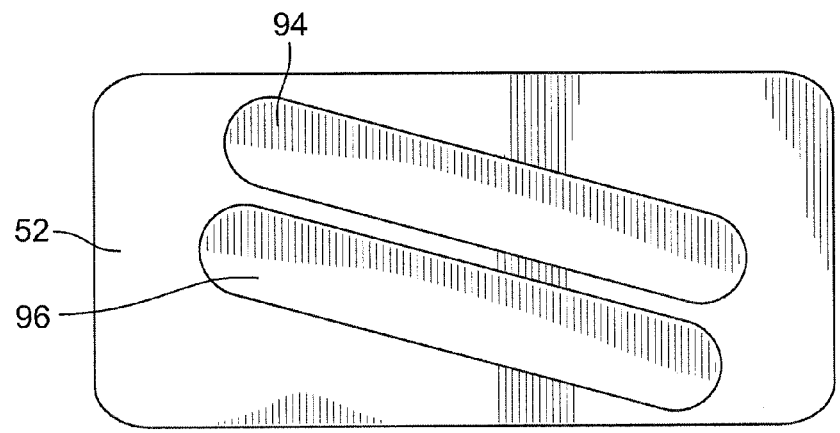
FIG. 4A is a top view of a die as known in the prior art and as used on the downstream clipping apparatus of FIG. 1.

Die 52 is shown in plan view in FIG. 4A and downstream punch 50 and die 52 are shown in FIG. 5A, Punch 50 and die 52 are standard clipper components, known in the art. Punch 50 forces clip 56 against die 52. Depression 94 in die 50 causes first leg 58 of clip 56 to fold inwards and depression 96 forces second leg 60 of clip 56 to fold inwards, causing clip 56 to close over neck 38.

Figure 4B:
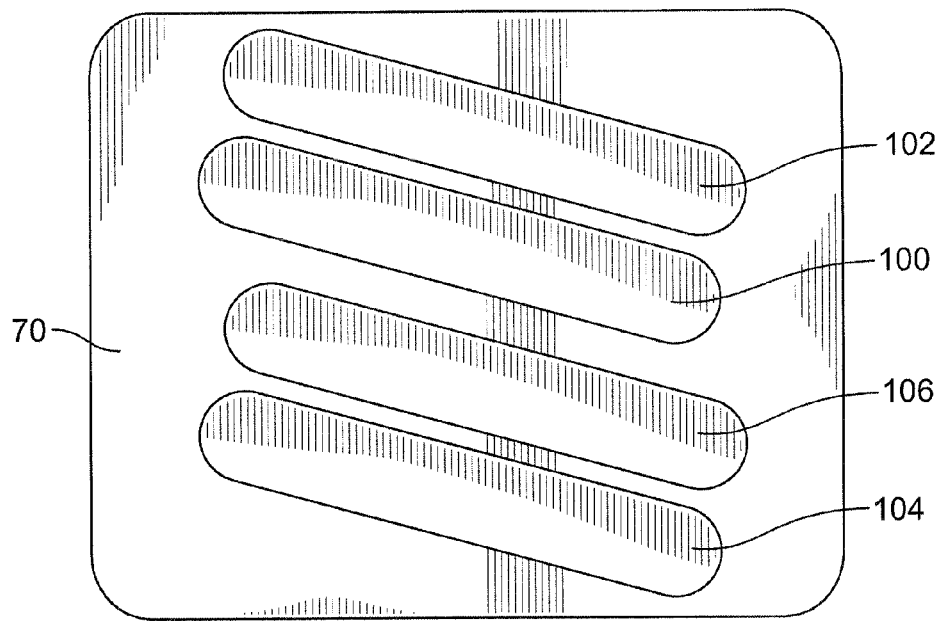
FIG. 4B is a top view of the die of the upstream clipping apparatus of FIG. 1.

Die 70 is shown in plan view in FIG. 4B and upstream punch 68 and die 70 are shown in FIG. 5B. Upstream punch 68 and die 70 must be specially configured. Die 70 has four depressions 100, 102, 104, 106, When punch 68 forces a pair of clips 74a, 74b against die 70, depression 100 causes first leg 76 of clip 74a to fold inwards and depression 102 causes second leg 78 of clip 74a to fold inwards, sealing neck 38. Simultaneously, depression 104 causes first leg 76 of clip 74b to fold inwards and depression 106 causes second leg 78 of clip 74b to fold inwards, further sealing neck 38. Accordingly, punch 68 and die 70 simultaneously apply a pair of Clips 74a, 74b to neck 38, as shown in FIG. 2.

While a preferred embodiment of the present invention is shown and described, it is envisioned that those skilled in the art may devise various modifications of the present invention without departing from the scope of the appended claims.

I claim:

1. A clipping system comprising:
   a first clipper comprising a clip reel, a clip rail, a punch, and a die, the punch configured to engage a single clip and the die having a set of two depressions configured to engage and bend a pair of legs of the single clip;
   a second clipper mounted adjacent the first clipper, the second clipper comprising a second clip reel, a second clip rail, a second punch, and a second die, the second punch configured to engage simultaneously a pair of clips, and the second die having two sets of two depressions configured to engage and bend the legs of the pair of clips.

2. A manufacturing system comprising a mixer, a sealer connected to the output of the mixer, and the clipping system of claim 1 placed downstream of the sealer.

3. A manufacturing system comprising a mixer, a netter connected to the output of the mixer, and the clipping system of claim 1 placed downstream of the sealer.

4. A method of making sausages, comprising the steps of:
   mixing ingredients to form a pasty mixture;
   pumping the pasty mixture to a sealer;
   extruding the pasty mixture into a tube;
   forming a void neck in the tube;
   applying a first clip to the void neck; and
   simultaneously applying a pair of second clips to the void neck.

5. The method of claim 4, further comprising severing the neck between the first clip and the pair of second clips.

6. The method of claim 4, further comprising the step of forming flat stock film into the tube.

7. The method of claim 4, wherein the tube comprises tubular casing or natural casing.

8. The method of claim 4, wherein the extruding the pasty mixture into a tube step further comprises extruding the pasty mixture into a tube and netting.

9. A method of making strings of sausages comprising performing the steps of claim 4, repeating the steps of claim 4 at least once, and performing the step of claim 5.

* * * * *